(12) United States Patent
Berkebile et al.

(10) Patent No.: US 10,913,014 B2
(45) Date of Patent: Feb. 9, 2021

(54) MULTIPLE RATE FILTER UNDERDRAIN LATERAL GAS METERING PLATE

(71) Applicant: Xylem Water Solutions Zelienople LLC, Zelienople, PA (US)

(72) Inventors: Dean T. Berkebile, Cranberry Township, PA (US); John L. Geibel, Butler, PA (US); Ivan Xuetang Zhu, Cranberry Township, PA (US)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 542 days.

(21) Appl. No.: 15/061,023

(22) Filed: Mar. 4, 2016

(65) Prior Publication Data

US 2016/0256800 A1    Sep. 8, 2016

Related U.S. Application Data

(60) Provisional application No. 62/128,788, filed on Mar. 5, 2015.

(51) Int. Cl.
*B01D 24/46* (2006.01)
*B01D 24/24* (2006.01)

(52) U.S. Cl.
CPC ......... *B01D 24/4631* (2013.01); *B01D 24/24* (2013.01)

(58) Field of Classification Search
None
See application file for complete search history.

(56) References Cited

U.S. PATENT DOCUMENTS

| | | | |
|---|---|---|---|
| 3,840,117 A | 10/1974 | Ross | |
| 4,707,257 A | 11/1987 | Davis et al. | |
| 5,019,259 A | 5/1991 | Hambley | |
| 5,087,362 A | 2/1992 | Brown | |
| 5,108,627 A | 4/1992 | Berkebile et al. | |
| 5,156,738 A | 10/1992 | Maxson | |
| 5,160,614 A | 11/1992 | Brown | |
| 5,232,592 A | 8/1993 | Brown et al. | |
| 5,328,608 A | 7/1994 | Bergmann et al. | |
| 5,639,384 A * | 6/1997 | Brown ............... | B01D 24/4631 210/794 |
| 5,865,999 A | 2/1999 | Shea et al. | |
| 6,306,310 B1 | 10/2001 | Bergmann et al. | |
| 6,312,611 B1 | 11/2001 | Bergman et al. | |
| 6,830,684 B2 | 12/2004 | Stegge | |
| 7,410,578 B2 | 8/2008 | Hambley et al. | |
| 7,736,506 B2 | 6/2010 | Roberts et al. | |
| 8,226,834 B2 | 7/2012 | Geibel | |
| 8,277,665 B2 | 10/2012 | Roberts et al. | |
| 2008/0099411 A1* | 5/2008 | Roberts ............. | B01D 24/4631 210/793 |

(Continued)

*Primary Examiner* — Robert J Popovics
(74) *Attorney, Agent, or Firm* — The Webb Law Firm

(57) ABSTRACT

A filtration system has at least one underdrain lateral, a flume, and at least one metering plate. The metering plate includes a plate member with at least one opening configured to receive liquid or gas therethrough at a first flow rate during a backwash function and is configured to receive liquid or gas therethrough at a second, lower flow rate during filtration. A method of metering gas into a filtration system with a metering plate is also disclosed. The metering plate allows gas to flow into each underdrain lateral at two very different flow rates.

8 Claims, 13 Drawing Sheets

(56) References Cited

U.S. PATENT DOCUMENTS

| | | | |
|---|---|---|---|
| 2008/0245750 A1* | 10/2008 | Geibel | B01D 24/4631 210/798 |
| 2010/0237025 A1* | 9/2010 | Geibel | B01D 24/24 210/791 |
| 2014/0251439 A1 | 9/2014 | Ball et al. | |
| 2015/0014259 A1* | 1/2015 | Ball | B01D 24/24 210/798 |
| 2016/0256800 A1* | 9/2016 | Berkebile | B01D 24/4631 |

* cited by examiner

US 10,913,014 B2

MULTIPLE RATE FILTER UNDERDRAIN LATERAL GAS METERING PLATE

CROSS REFERENCE TO RELATED APPLICATIONS

This application claims the benefit of U.S. Provisional Patent Application No. 62/128,788, filed on Mar. 5, 2015, the disclosure of which is hereby incorporated in its entirety by reference.

BACKGROUND OF THE INVENTION

Field of the Invention

The present invention relates to filtration systems and, more specifically, to a filtration system with a metering plate for metering gas into an underdrain lateral at different flow rates.

Description of Related Art

In typical filters for filtering water or wastewater, one or more filter tanks are arranged in adjacent or opposing batteries. Filter underdrain laterals are laid on the floor of the filter tank, one next to the other in parallel rows, to define gas and liquid flow conduits, below a bed of filtering media. The conduits make it possible to distribute influent liquid during filtration and distribute gas and liquid for backwash, which cleans the filter media and provides for a longer filter life. A common main conduit ("flume") is typically located immediately next to the filter tank to distribute influent liquid to the underdrain laterals during filtration and to distribute gas and/or liquid to the underdrain laterals during a backwash cycle.

Passing air through a lateral-based filtration system in an upflow flooded filter requires two very different flow rates. The first flow rate is a backwash rate of air delivered substantially equally to each underdrain lateral. However, the same physical system must also deliver a much lower loading rate, such as an ultra-low flow rate, of air during filtration delivered substantially equally to each underdrain lateral. However, it is difficult for a lateral style underdrain to distribute air at ultra-low loading rates without dedicated air chambers or extensive air piping distribution systems.

One method to distribute two very different air rates substantially equally to the underdrain laterals during both the backwash cycle and filtration, would be to have two different air header piping systems. Alternatively, a system accomplishing a similar end could be set up using one metering plate plus one separate air header system. Both of these methods are more expensive and not the most efficient design.

Therefore, there is a need in the industry for a more favorable design of a metering plate that allows for at least two very different flow rates—one for the backwash cycle and one for filtration—to equally distribute air into each underdrain lateral.

SUMMARY OF THE INVENTION

In one embodiment, a filtration system includes at least one underdrain lateral having a plurality of underdrain blocks, a flume, and at least one metering plate. The metering plate is positioned between the at least one underdrain lateral and the flume. Each metering plate includes a plate member, the plate member including at least one opening. At least one opening is configured to receive liquid or gas therethrough at a first flow rate during a backwash function and is configured to receive liquid or gas therethrough at a second, lower flow rate during filtration. The first flow rate can be a flow rate of gas of 3-5 scfm/sf during the backwash function. The second flow rate can be a flow rate of gas at an ultra-low flow rate of 0.25-1.5 scfm/sf during filtration. The amount of gas flowing through the at least one opening of each metering plate can be distributed to each underdrain lateral substantially equally during filtration. The amount of gas flowing through the at least one opening of each metering plate can be distributed to each underdrain lateral substantially equally during a backwashing cycle. The metering plate can include two openings, a first opening and a second opening, positioned at different elevations along the metering plate. The first opening can have the same or smaller area than the second opening and be positioned at a higher elevation along the metering plate than the second opening. The first opening can be configured to receive gas therethrough at the second flow rate. The first flow rate through the first and second openings can be a flow rate of gas of 3-5 scfm/sf during the backwash function. The second flow rate through the first opening can be a flow rate of gas at an ultra-low flow rate of 0.25-1.5 scfm/sf during filtration.

In another embodiment, a metering plate includes a plate member with at least one opening. At least one opening is configured to receive liquid or gas therethrough at a first flow rate during a backwash function and is configured to receive liquid or gas therethrough at a second, lower flow rate during filtration. The metering plate is configured to be positioned in a filtration system between a flume and an underdrain lateral, the underdrain lateral including a plurality of underdrain blocks. The first flow rate can be a flow rate of gas of 3-5 scfm/sf during the backwash function. The second flow rate can be a flow rate of gas at an ultra-low flow rate of 0.25-1.5 scfm/sf during filtration. The amount of gas flowing through the at least one opening of the metering plate can be distributed to each underdrain lateral substantially equally during filtration. The amount of gas flowing through the at least one opening of the metering plate can be distributed to each underdrain lateral substantially equally during a backwashing cycle. The plate member can include a plurality of attaching holes. In one embodiment, the plate member has two openings, a first opening and a second opening are positioned at different elevations along the metering plate. The first opening can have the same or smaller area than the second opening and be positioned at a higher elevation along the metering plate than the second opening. The first opening can be configured to receive gas therethrough at the second flow rate during filtration.

In another embodiment a method of metering gas into a filtration system at a plurality of flow rates includes: (1) positioning at least one metering plate between at least one underdrain lateral and a flume, each metering plate including a plate member, the plate member including at least one opening, wherein at least one opening is configured to receive liquid or gas therethrough at a first flow rate during a backwash function and is configured to receive liquid or gas therethrough at a second, lower flow rate during filtration; (2) filtering liquid or gas through the filtration system; and (3) backwashing the filtration system using liquid or gas. The first flow rate can be a flow rate of gas of 3-5 scfm/sf during the backwash function. The second flow rate can be a flow rate of gas at an ultra-low flow rate of 0.25-1.5 scfm/sf during filtration. The amount of gas flowing through the at least one opening of each metering plate can be distributed to the underdrain laterals substantially equally during filtration and the amount of gas flowing through the at least one opening of each metering plate can be distributed to the underdrain laterals substantially equally during a backwashing cycle.

From the foregoing disclosure and the following more detailed description of various preferred embodiments, it will be apparent to those skilled in the art that the present invention provides a significant advance in the technology and art of filtration systems.

DETAILED DESCRIPTION OF THE INVENTION

It will be apparent to those skilled in the art that many uses and design variations are possible for the filtration system disclosed herein. The following detailed discussion of various alternative and preferred embodiments will illustrate general principles of the invention, but other embodiments and variations will be apparent to those skilled in the art given the benefit of this disclosure.

All ranges provided in this disclosure should be interpreted as including the endpoints of the listed range. For instance, if a flow rate range of 3-5 scfm/sf is disclosed, 3 scfm/sf and 5 scfm/sf, are included in that range as well.

Figure 1:
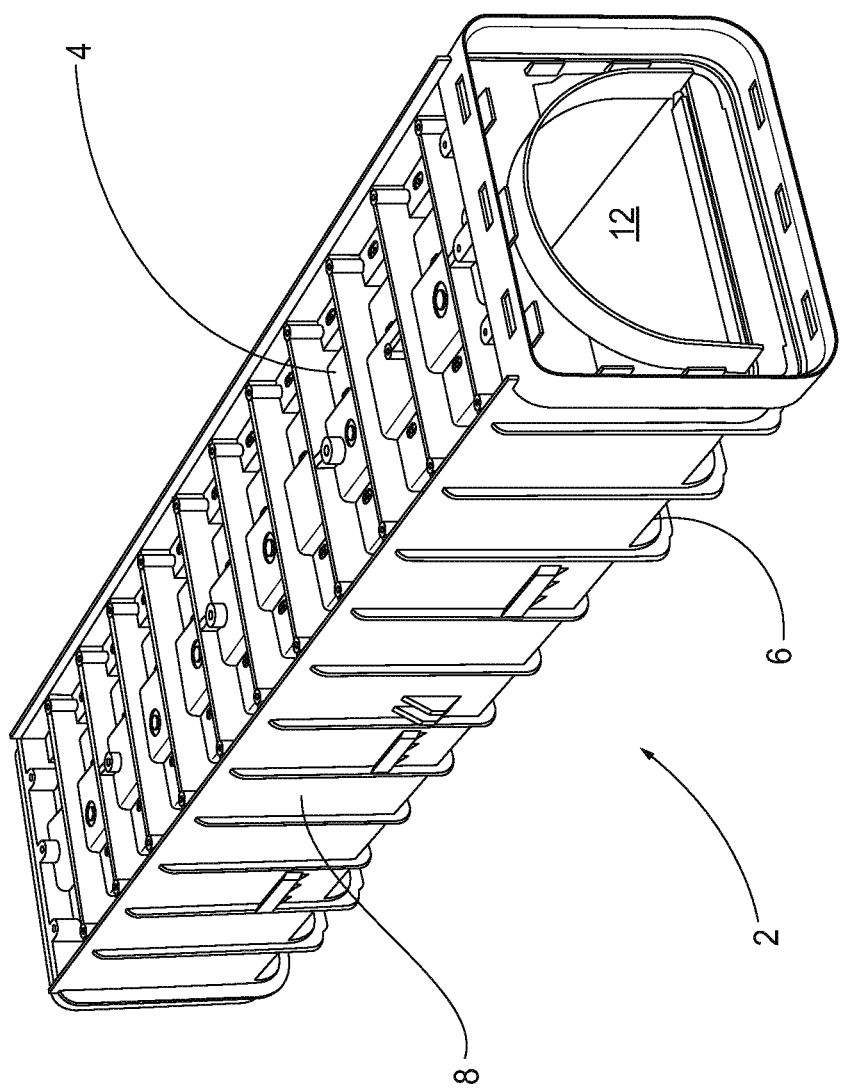
FIG. 1 shows a perspective view of an underdrain block without a metering plate, according to one embodiment of the invention.

FIG. 1 illustrates one non-limiting embodiment of an underdrain block (2) used in the present invention. The underdrain block (2) can have a top wall (4), a bottom wall (6), and two side walls (8) that connect the top wall (4) to the bottom wall (6) to define an underdrain block interior (12). A layer or multiple layers of filter media (not shown) can be poured on top of the underdrain block (2). The filter media can act to remove undesirable particles from a liquid that is being filtered through a filtration system using the underdrain blocks (2).

Underdrain blocks (2), like those shown in FIG. 1, can be connected together to form an underdrain lateral. An underdrain lateral can be formed when a plurality of underdrain blocks (2) are connected end-to-end to form a row of underdrain blocks (2). The filtration system of the present invention can have at least one underdrain lateral. A plurality of underdrain laterals can be aligned side-by-side, parallel, on the floor of a filter tank in a gravity filtration system.

FIGS. 2-8 illustrate non-limiting embodiments of a metering plate (10) of the present invention. Each metering plate (10) of the present invention has a plate member (16). Each plate member (16) includes at least one metering opening (14). Some embodiments include plate members (16) having at least two metering openings (14).

In an embodiment having one metering opening (14), a first opening (D1), the first opening (D1) can be configured to receive liquid or gas therethrough at a first flow rate during a backwash function. The first opening (D1), in this embodiment, can also be configured to receive liquid or gas therethrough at a second, lower, such as an ultra-low, flow rate during filtration. In an embodiment having more than one metering opening (14), such as a first opening (D1) and a second opening (D2), at least one opening (D1 or D2) can be configured to receive liquid or gas therethrough at a first flow rate during a backwash function. At least one opening (D1 or D2) can be configured to receive liquid or gas therethrough at a second, lower, such as an ultra-low, flow rate during filtration.

With continued reference to FIGS. 2-8, the metering openings (14) in the plate member (16) can be any conceivable shape. For instance, as in FIGS. 2-4, the metering openings (14) are configured as round openings. As a second example, such as in FIG. 5, the metering opening (14) is triangular in shape. There can also be multiple triangular metering openings (14) in the plate member (16). In other embodiments, the metering openings (14) are slots, such as in FIGS. 6-8. In one embodiment, the metering openings (14) are square or rectangular in shape. Other shapes are also contemplated for the metering openings (14) in the plate member (16).

Additionally, a plate member (16) may include any number of metering openings (14). In some embodiments, such as the triangular or slot metering openings (14) of FIGS. 5-7, only one metering opening (14) is provided in the plate member (16). In other embodiments, such as in FIGS. 2, 3, 4, and 8, multiple metering openings (14) are provided in the plate member (16).

Figure 2:
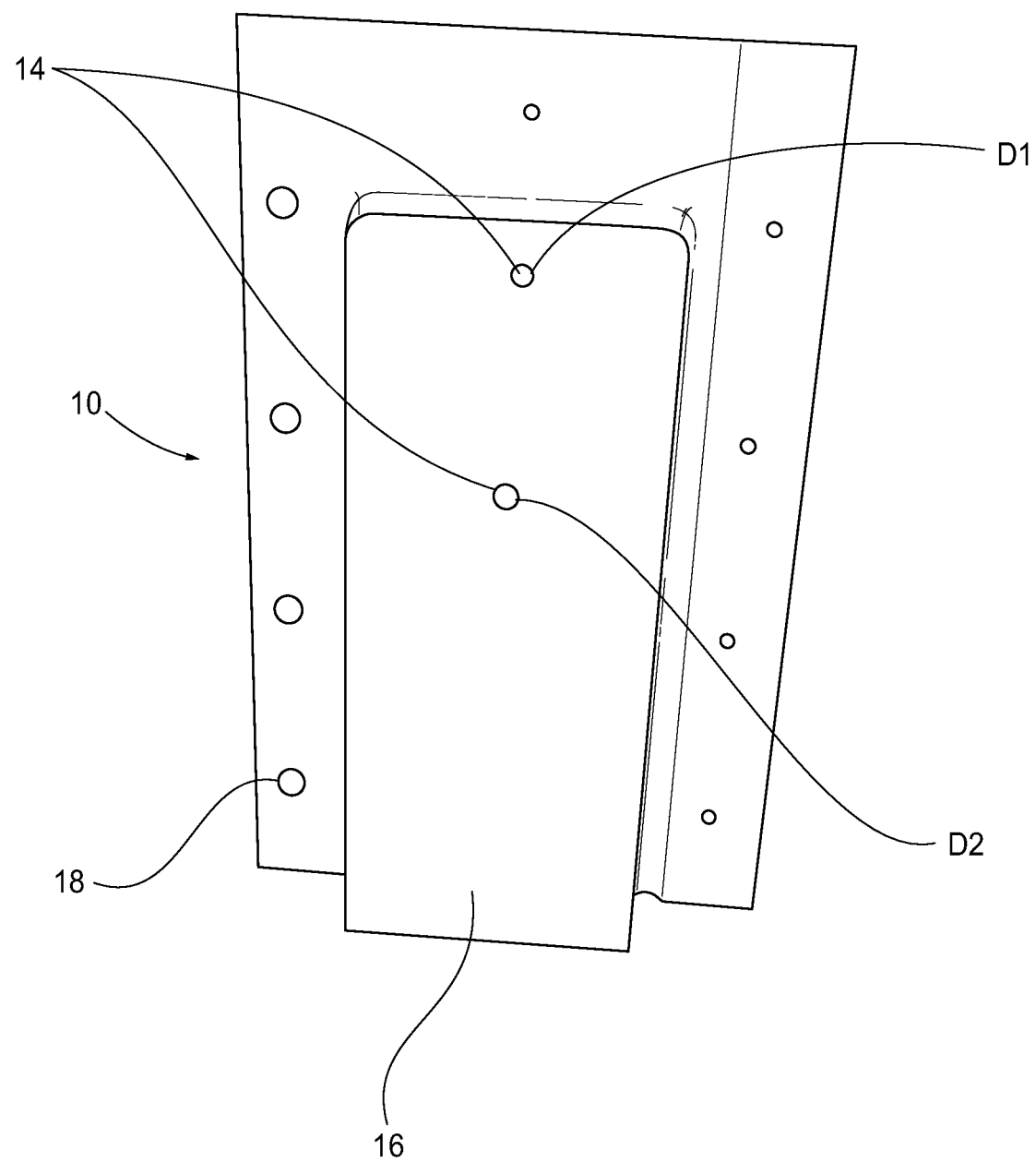
FIG. 2 shows a perspective view of a metering plate according to one embodiment of the invention.

Referring to FIG. 2, the metering plate (10) can have a plurality of metering openings (14), includes a first opening (D1) and a second opening (D2) in the plate member (16). A plurality of attaching holes (18) can surround the plate member (16) for attaching the metering plate (10) to a flume wall (not shown). The first opening (D1) can be located at a different, higher elevation along plate member (16) than the second opening (D2). Additionally, the first opening (D1) can have the same or a smaller area than the second opening (D2). This may not always be the case, and the area of the first opening (D1) could be larger than the area of the second opening (D2).

Figure 3:
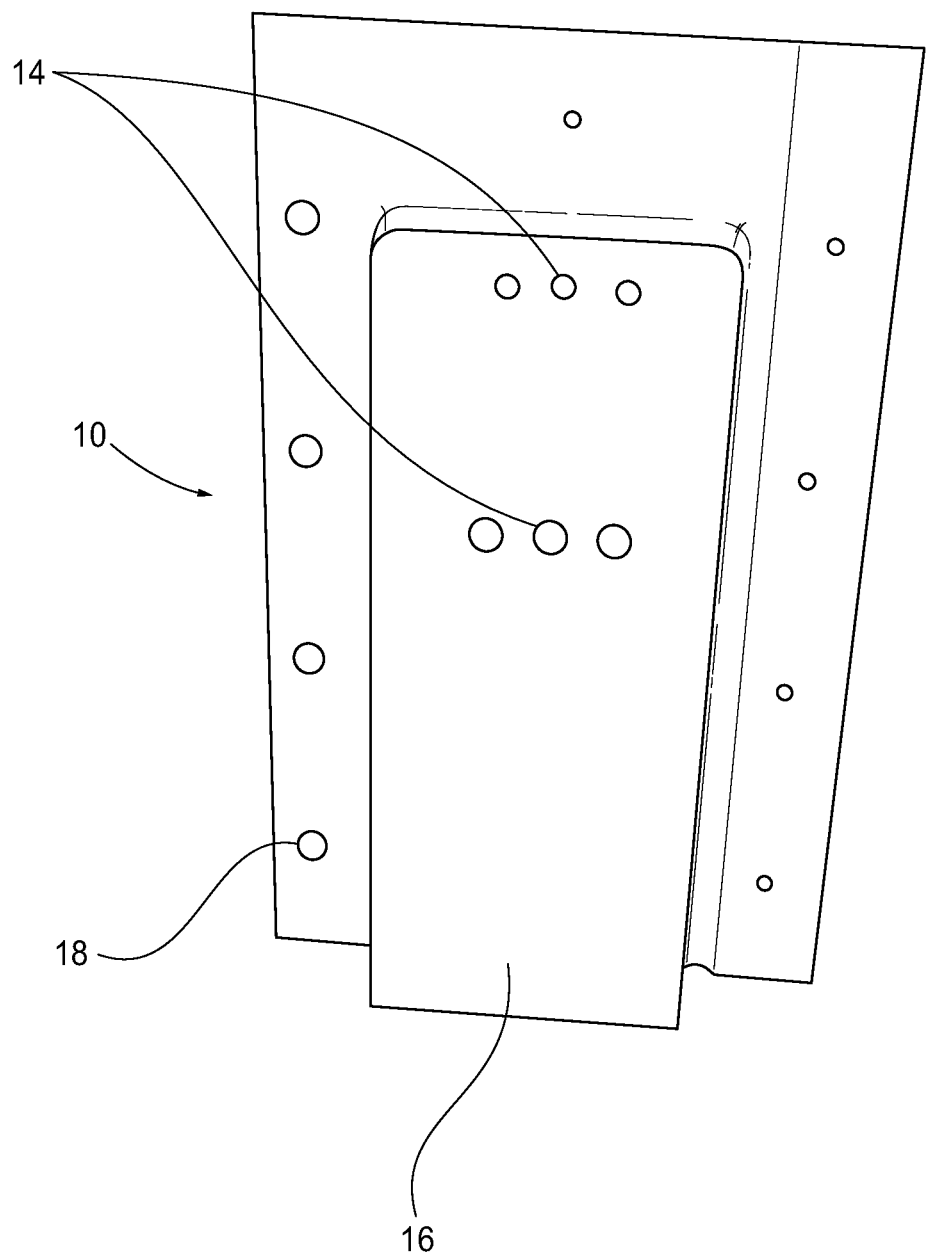
FIG. 3 shows a perspective view of a metering plate according to another embodiment of the invention.

FIG. 3 shows that the present invention is not limited to a metering plate (10) with only two metering openings (14), and the metering plate (10) can include more than two metering openings (14). There can be more than two metering openings (14) having the same or varying area. These metering openings (14) can also be located at multiple elevations along the metering plate (10). Any given elevation of the metering plate (10) can have more than one metering opening (14), as shown in FIG. 3. The metering plate (10) in FIG. 3 shows a metering plate (10) with six metering openings (14), three metering openings (14) at a higher elevation along the plate member (16), and three metering openings (14) at a lower elevation along the plate member (16). In the embodiment shown, the three higher elevation metering openings (14) are each the same size and have a smaller area than the three lower elevation metering openings (14). However, it is possible for the size of the metering openings (14) at the same level to be varied. In some embodiments, one of the metering openings (14) at a higher elevation can have a larger area than one of the metering openings (14) at a lower elevation, while the area of the metering openings (14) at a lower elevation combined is still larger than the area of the metering openings (14) at a higher elevation combined. In other embodiments, the combined area of the metering openings (14) at a higher elevation may be larger than the combined area of the metering openings (14) at a lower elevation.

Figure 4:
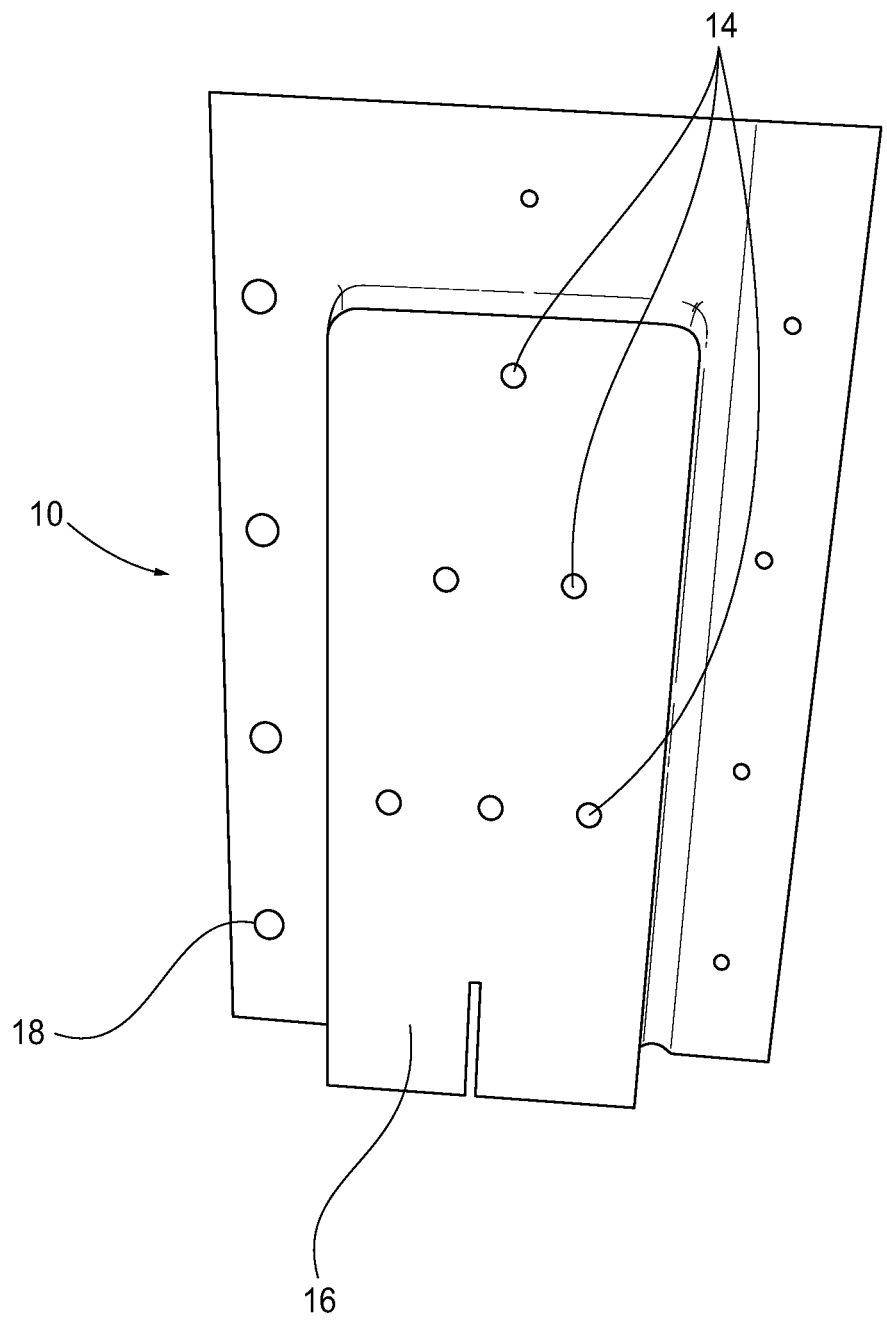
FIG. 4 shows a perspective view of a metering plate according to another embodiment of the invention.

Referring to FIG. 4, the metering plate (10) can have metering openings (14) at more than two elevations, such as three different elevations. In one embodiment, the metering opening (14) at the highest elevation can have the same or smaller area than the metering openings (14) at lower elevations. There can be one or multiple metering openings (14) at each elevation along the plate member (16). Additionally, metering openings (14) of different shapes can be used on the same metering plate (10), such as using slots and round openings together.

Figure 5:
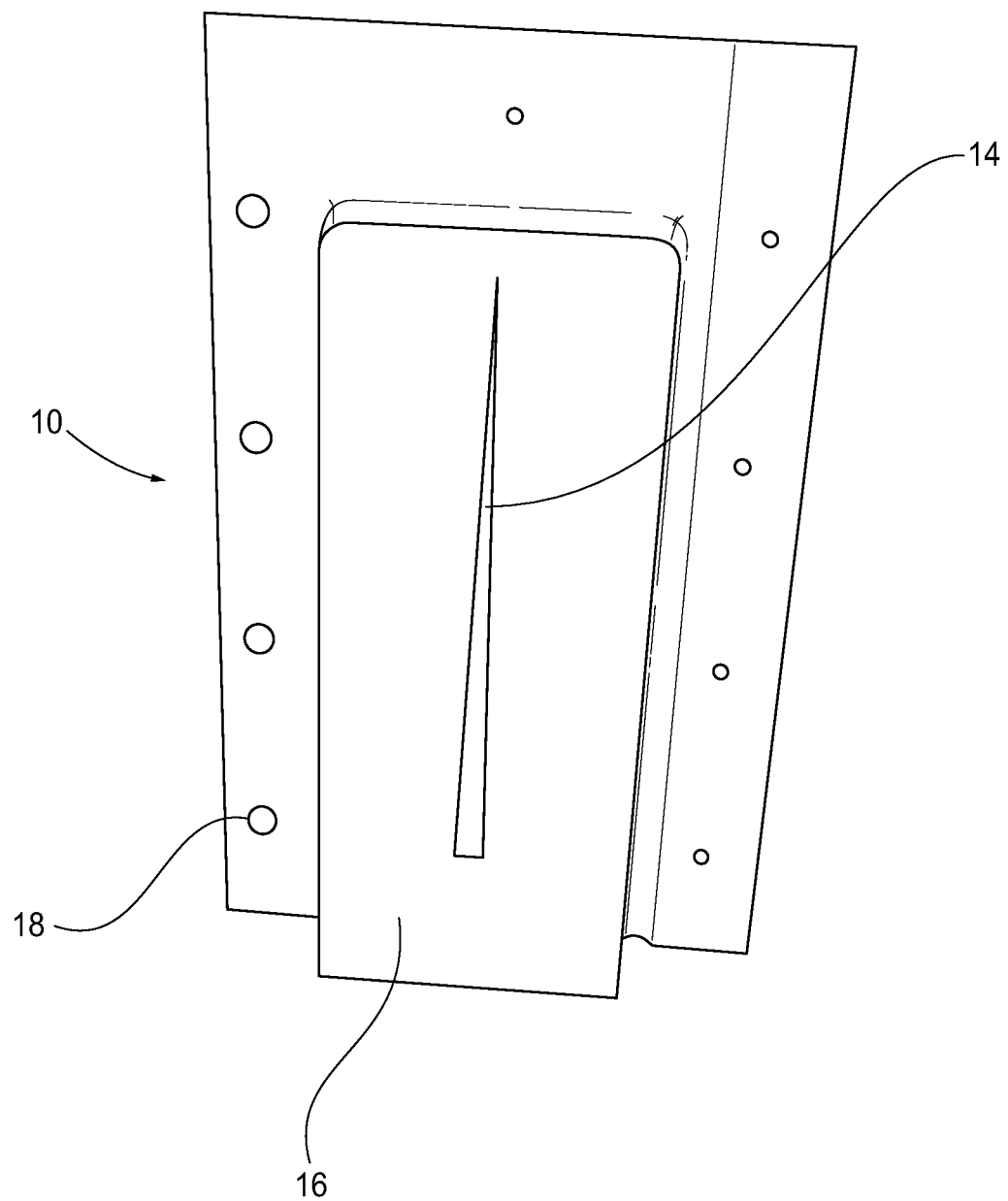
FIG. 5 shows a perspective view of a metering plate according to another embodiment of the invention.

Referring to FIG. 5, in one embodiment, the metering plate (10) can include one metering opening (14) located in the plate member (16), which is triangular in shape. In this embodiment, the triangular metering opening (14) has a greater area near a bottom of the metering opening (14) than near a top of the metering opening (14). However, it is contemplated that the size of the triangular metering opening (14) and the dimensions of the triangular metering opening (14) shown in FIG. 5 could be altered. The orientation of the triangular metering opening (14) could be rotated to have a different orientation.

Figure 6:
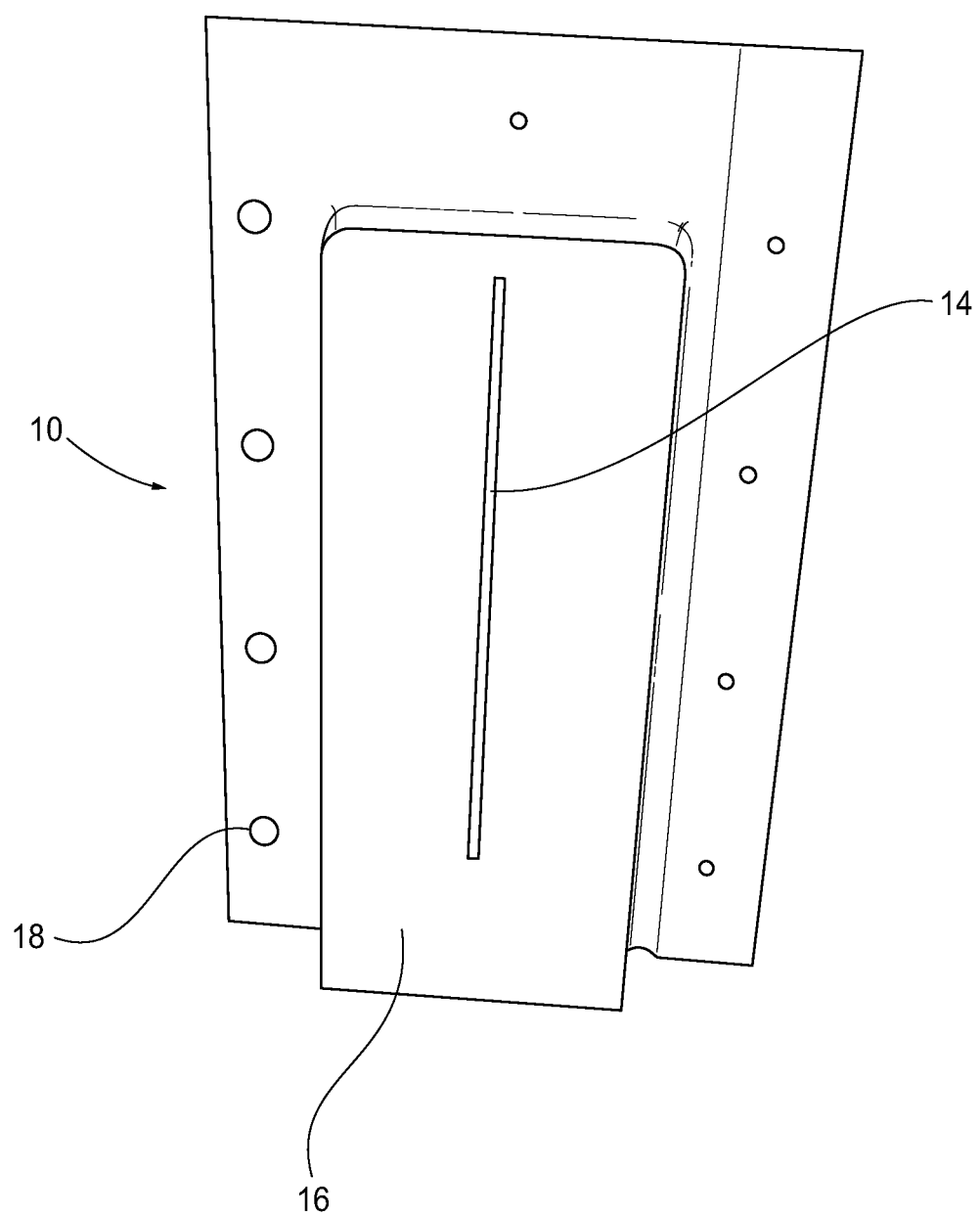
FIG. 6 shows a perspective view of a metering plate according to another embodiment of the invention.
Figure 7:
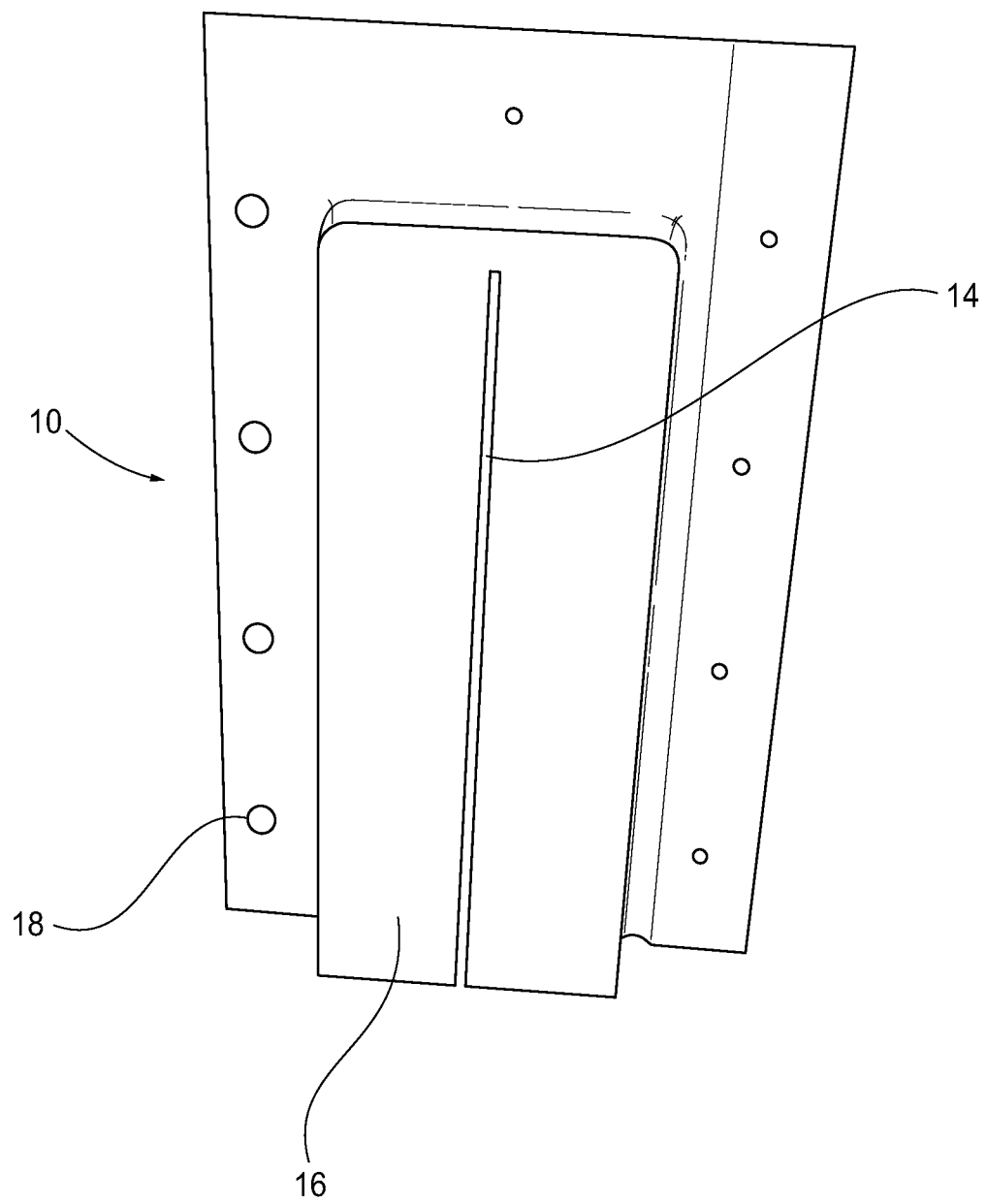
FIG. 7 shows a perspective view of a metering plate according to another embodiment of the invention.

Referring to FIGS. 6-7, in one embodiment, the metering plate (10) can include one slot-shaped metering opening (14) located in the plate member (16). The slot-shaped metering opening (14) can extend from near the top of the plate member (16) to near the bottom of the plate member (16), as in FIG. 6, or can extend all the way to the bottom of the plate member (16), as in FIG. 7. In these embodiments, the slot-shaped metering opening (14) can be horizontally centered in the plate member (16), but it is also contemplated that slot-shaped metering opening (14) be off-center.

Figure 8:
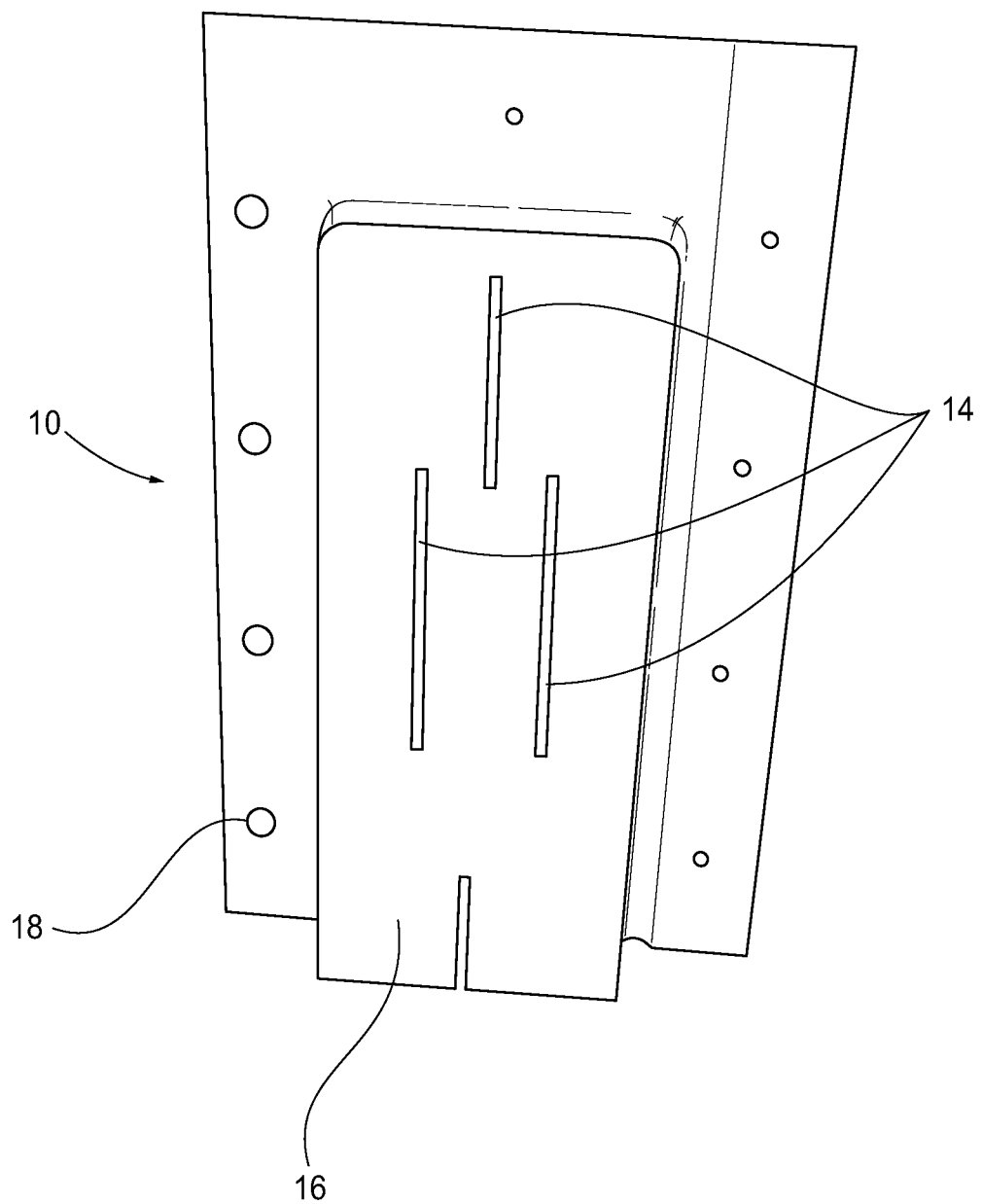
FIG. 8 shows a perspective view of a metering plate according to another embodiment of the invention.

Referring to FIG. 8, in one embodiment, the metering plate (10) can include a plurality of slot-shaped metering openings (14). The slot-shaped metering openings (14) can be located at the same or different elevations along the plate member (16). The slot-shaped metering openings (14) can have the same or different areas. In one embodiment, as in FIG. 8, the area of the slot-shaped metering opening (14) located at a higher elevation along the plate member (16) is smaller than the area of at least one of the slot-shaped metering openings (14) located at a lower elevation along the plate member (16).

As previously discussed, in certain embodiments having a first opening (D1) and a second opening (D2) (e.g. FIG. 2), the first opening (D1) can have a smaller or identical area compared to the second opening (D2). The first opening (D1) can also be located at a higher elevation along the plate member (16). In this embodiment, the first opening (D1) can be a small hole near the top of the plate member (16), used to facilitate air (going upward) but at a much lower rate during the production phase of upward filtration. In this embodiment, the larger area of the second opening (D2), located at a lower elevation of the plate member (16), is used to facilitate enough air during a backwashing cycle. In this embodiment of the invention, the first opening (D1) can be used to allow to flow gas therethrough during filtration, while the first opening (D1) and the second opening (D2) can be used to allow gas to flow therethrough during a backwashing cycle.

The metering plate (10) can be used to facilitate the flow of gas, such as air from a flume (20) into the underdrain laterals at two or more very different flow rates. One flow rate can be an ultra-low flow rate during filtration in which gas flows from the flume (20), through at least one of the metering openings (14), and into the underdrain laterals. For instance, based on the metering plate (10) shown in FIG. 2, in one embodiment, gas from the flume (20) flows into the underdrain laterals through the first opening (D1) at an ultra-low flow rate during filtration. The ultra-low flow rate during filtration can be any sufficient flow rate. In one embodiment, the ultra-low flow rate is 0.25-1.5 scfm/sf.

The second flow rate can be a very different flow rate. The second flow rate can be greater than the ultra-low flow rate during filtration and can be used during a backwashing cycle in which gas can flow through the flume (20), through at least one of the metering opening(s) (14), and into the underdrain laterals. For instance, based on the metering plate (10) shown in FIG. 2, in one embodiment, gas from the flume (20) flows into the underdrain laterals through both the first opening (D1) and the second opening (D2) at the second flow rate. This second, higher flow rate can be any sufficient flow rate to carry out the backwash cycle. In one embodiment, the second flow rate is 3-5 scfm/sf.

Metering openings (14) having different areas can allow for different flow rates of gas therethrough. The gas can be air but the gas is not limited to air. Metering openings (14) of the same area can also allow for different flow rates of gas therethrough where the metering openings (14) of the same area are located at different elevations along the metering plate (10).

Figure 9:
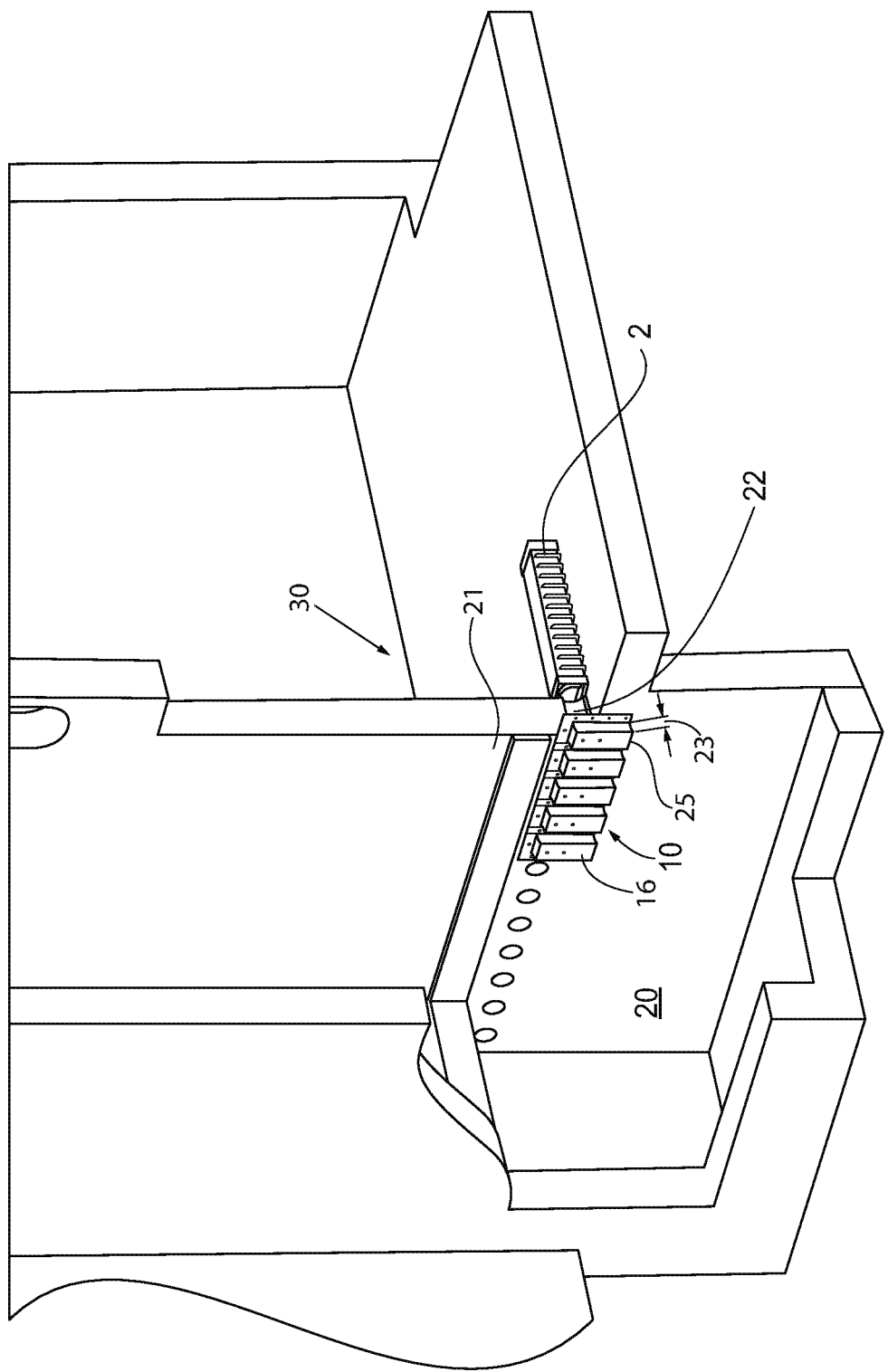
FIG. 9 shows a perspective view of a metering plate installed in a filtration system according to one embodiment of the invention.
Figure 10:
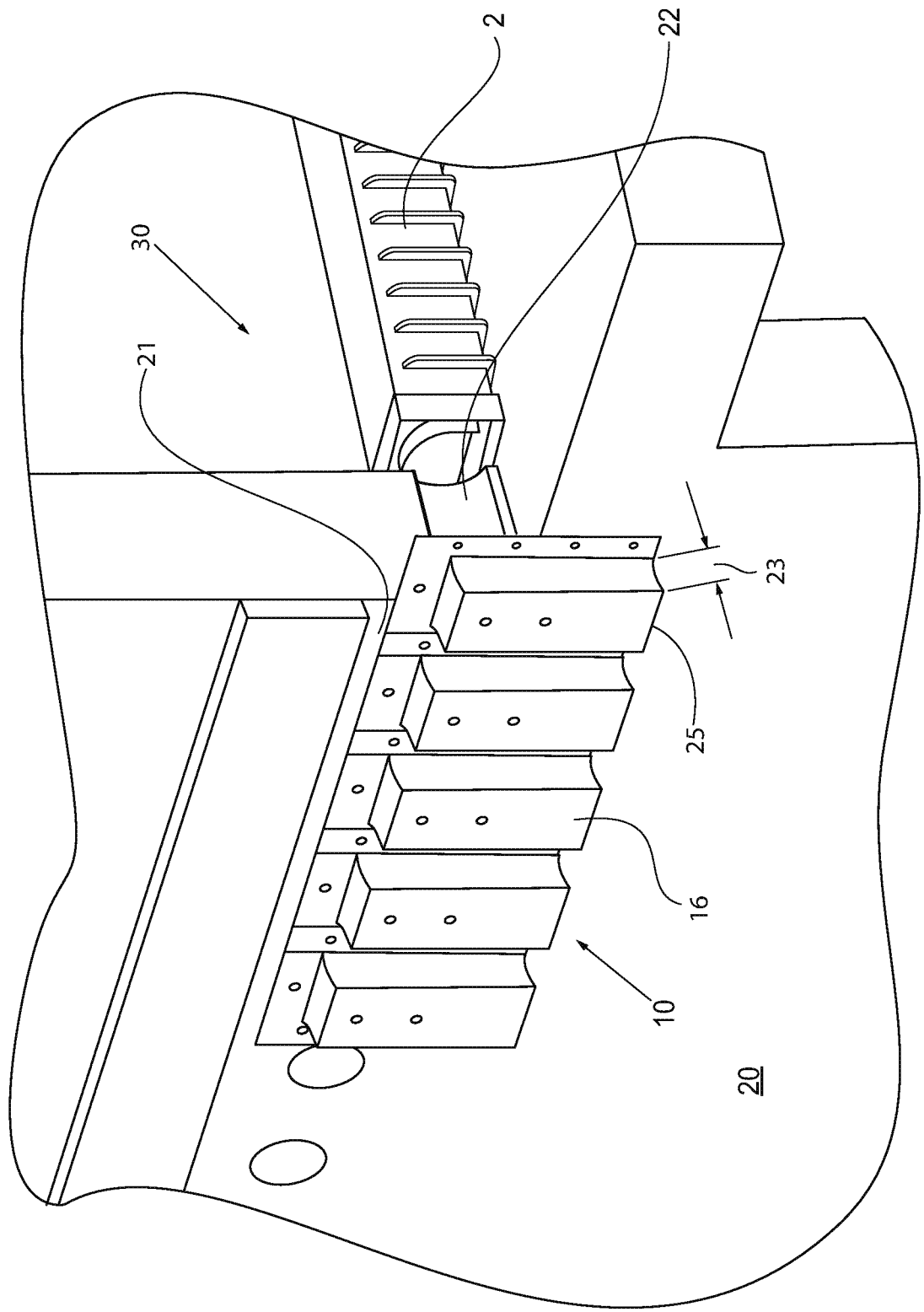
FIG. 10 shows a perspective view of the metering plate installed in the filtration system of FIG. 9.
Figure 11:
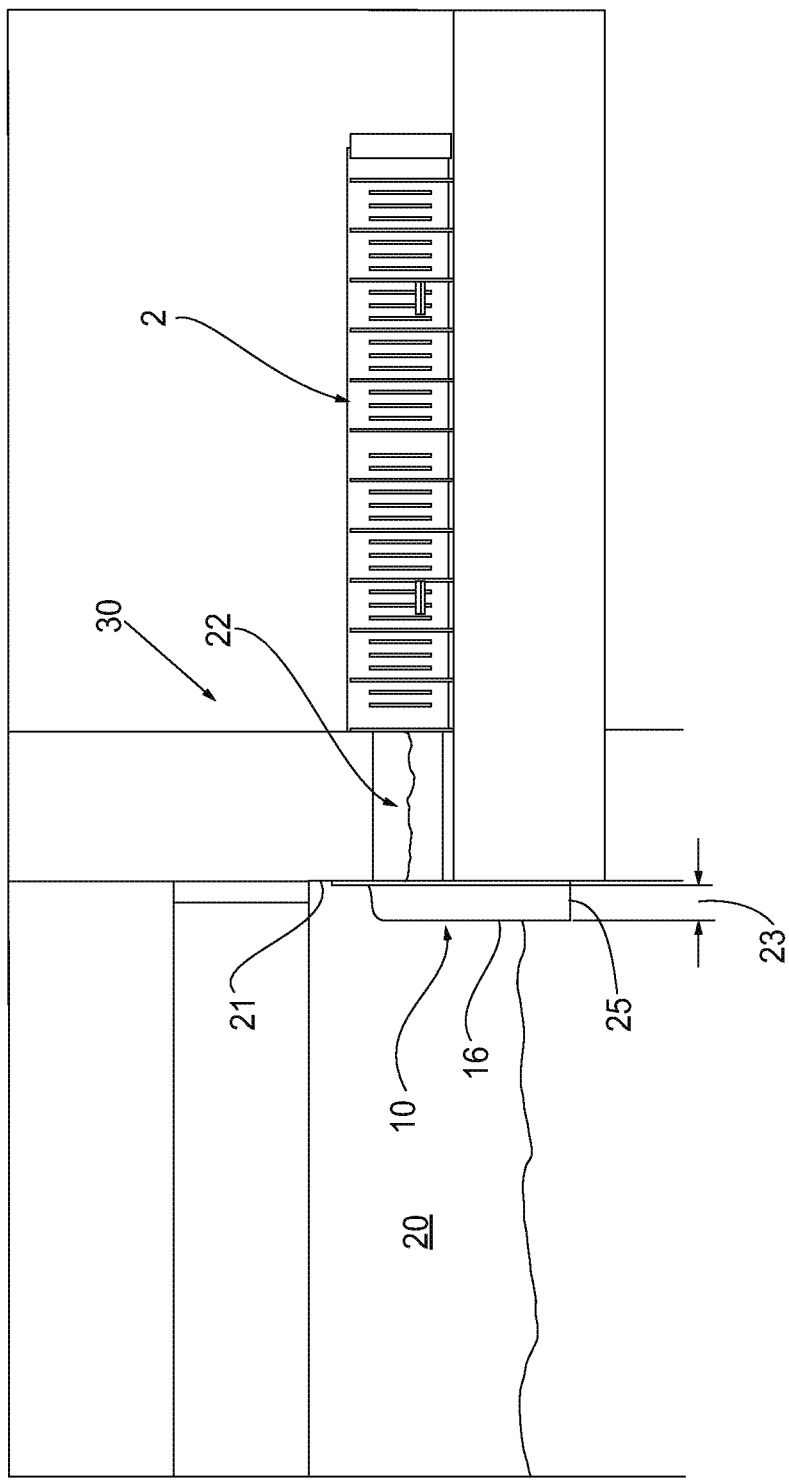
FIG. 11 shows a side view of a metering plate installed in a filtration system according to one embodiment of the invention.

FIGS. 9-11 show that the metering plate (10) can be installed in a filtration system (30). In this embodiment of the invention, the metering plate (10) can act as an interface between the underdrain lateral (made up of underdrain blocks (2)) and the flume (20). The flume (20) can be a common main conduit located next to the underdrain laterals to distribute influent liquid to the underdrain laterals during filtration and to distribute gas and/or liquid to the underdrain laterals during a backwashing cycle.

FIGS. 9 and 10 show one embodiment of the invention with the flume (20) located next to the underdrain laterals. In this embodiment, the flume (20) and the underdrain laterals can be separated by a chamber (22). On one end of the chamber (22) can be a metering plate (10). Thus, in this embodiment, liquid and/or gas can travel from the flume (20) to the underdrain laterals next to the flume (20) by traveling from the flume (20) through the metering opening (s) (14), through the chamber (22), and into the underdrain laterals.

The metering plate (10), in the filtration system (30) of the present invention, can be positioned on a flume end. A flume end means the end of the underdrain lateral on which a flume (20) is located. The metering plate (10) can be positioned on a flume end and secured to the flume wall (21) between the underdrain laterals and the flume (20), as shown in FIGS. 9 and 10. The plate member (16) of the metering plate (10) define an offset (23) from the flume wall (21). This offset (23) allows water to flow in the space or conduit between the plate member (16) and the flume wall (21) and allows water to flow through a bottom end (25) (open end) of the metering plate (10). The offset (23) between the plate member (16) and the flume wall (21) can be sufficient to allow water to flow concurrently with the air and with minimal restriction (i.e., minimal head loss) during either filtration or the backwash function.

The metering plate (10) can be secured in a position between the underdrain laterals and the flume (20), such as to the flume wall (21), by any means known to secure a metering plate (10). In one embodiment, the metering plate (10) is fastened to the flume wall (21) using screws or bolts. Attaching holes (18), shown in FIGS. 9-10, can be used to secure the metering plate (10) between the flume (20) and the underdrain laterals. The attaching holes (18) can be configured around the perimeter of the metering plate (10) to secure the metering plate (10). As shown in FIGS. 9-10, the attaching holes (18) of one metering plate (10) can overlap with the attaching holes (18) of an adjacent metering plate (10), to secure both metering plates (10) to the flume wall (21). In an alternate embodiment, instead of one metering plate (10) securing to each individual underdrain lateral as in FIGS. 9-11, it is contemplated that one continuous metering plate (10), which covers all of the underdrain laterals could be used. This would allow the metering plate (10) used at the interface of the flume (20) and the underdrain laterals to be one piece, as opposed to having a separate metering plate (10) for each underdrain lateral.

In one embodiment of the invention (e.g., FIG. 2), the metering plate (10) can include a plate member (16) including two metering openings (14), the first opening (D1) and second opening (D2), with the first opening (D1) having a smaller area than the second opening (D2). In this embodiment, air can flow through the first opening (D1) during filtration. To begin this filtration process, air, starting in the flume (20), can flow through the metering plate (10) by way of the first opening (D1). The air then entering the underdrain lateral can flow through the underdrain lateral and into the filter media. Air flowing through the first opening (D1) and into the underdrain lateral can be delivered substantially equally to each underdrain lateral. During filtration, the rate of air can flow at an ultra-low loading rate, normally 0.25-1.5 scfm/sf. Thus, in this embodiment of the invention, air can flow through the metering plate (10) and into the underdrain lateral at different rates, depending on the desired process.

This embodiment of the invention can also be used during a backwash cycle. Air can flow through the metering plate (10) by way of both the first and second openings (D1 and D2). The air can enter the underdrain lateral through the metering plate (10). Air flowing through both openings (D1 and D2) and into the underdrain lateral can be delivered substantially equally to the underdrain lateral. During this backwash cycle, the backwash rate of air can be 3-5 scfm/sf. Thus, in this embodiment of the invention, air can flow through the metering plate (10) and into the attached underdrain lateral at multiple rates, depending on the desired process.

In one embodiment of the invention, shown in FIGS. 9 and 10, the filtration system (30) can have multiple metering plates (10). According to this embodiment, the filtration system can also have multiple underdrain laterals. FIGS. 9 and 10 show one underdrain block (2) of one underdrain lateral for simplicity, but the filtration system, according to this embodiment, can have underdrain blocks (2) attached end-to-end to form underdrain laterals, and multiple underdrain laterals can be each aligned parallel with one another. FIGS. 9 and 10 show multiple metering plates (10) positioned between the flume (20) and the underdrain laterals, and these multiple metering plates (10) can be positioned one next to another. Additionally, the attaching holes (18) of one metering plate (10) can overlap the attaching holes (18) of an adjacent metering plate (10) to secure the metering plates (10) in their position between the flume (20) and the underdrain laterals. As shown in FIGS. 9 and 10, each underdrain lateral can correspond with a metering plate (10), separated by a chamber (22).

In the present invention, air can be delivered through the metering openings (14) of the metering plate (10) into the underdrain lateral substantially equally during both the backwash cycle and filtration. The distance between the metering openings (14) can be critical, as it allows for the mitigation of reasonable elevation variance between underdrain laterals, and headloss across the metering openings (14) can allow for air to be distributed in each underdrain lateral at substantially the same rate.

As previously discussed, in an embodiment such as in FIG. 2, the amount of gas flowing through the first opening (D1) during filtration or through both the first and second openings (D1 and D2) during a backwash cycle can be distributed to each underdrain lateral substantially equally. Substantially equally means that each underdrain lateral receives gas at substantially the same flow rate. The flow rates are considered substantially equal if the flow rates delivered to each underdrain lateral of the filtration system follow the range of the intended flow rate ±10% of the intended flow rate. For example, if, during filtration, the intended flow rate of air to the system is 1.0 scfm/sf, the flow rate to each underdrain lateral must be greater than or equal to 0.9 scfm/sf and less than or equal to 1.1 scfm/sf. In another example, if, during the backwashing cycle, the intended flow rate of air to the underdrain laterals is 5.0 scfm/sf, the flow rate delivered to each underdrain lateral must be greater than or equal to 4.5 scfm/sf but less than or equal to 5.5 scfm/sf.

Figure 12:
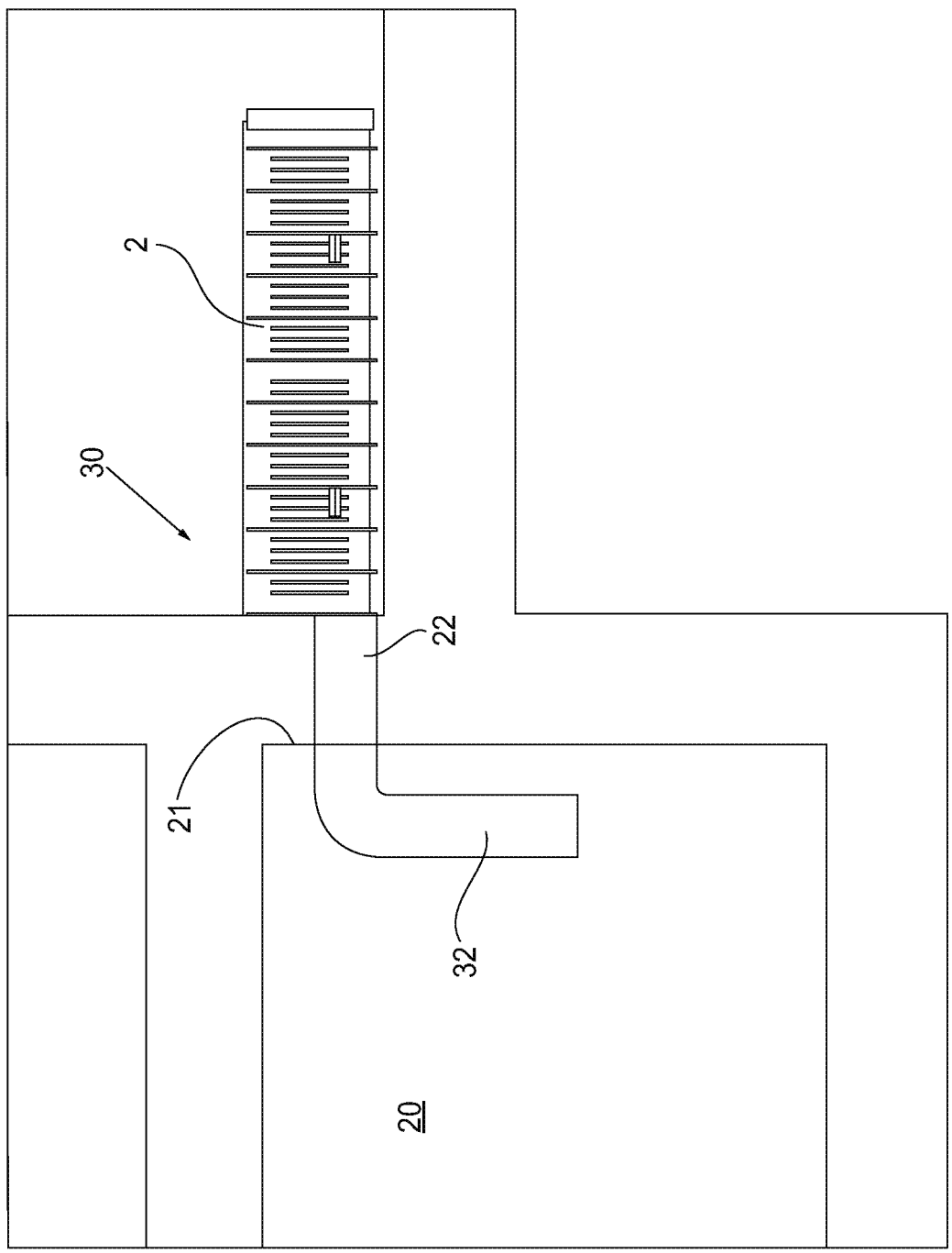
FIG. 12 shows a side view of a filtration system with a pipe member in fluid communication with an underdrain lateral according to an alternate embodiment of the invention.
Figure 13:
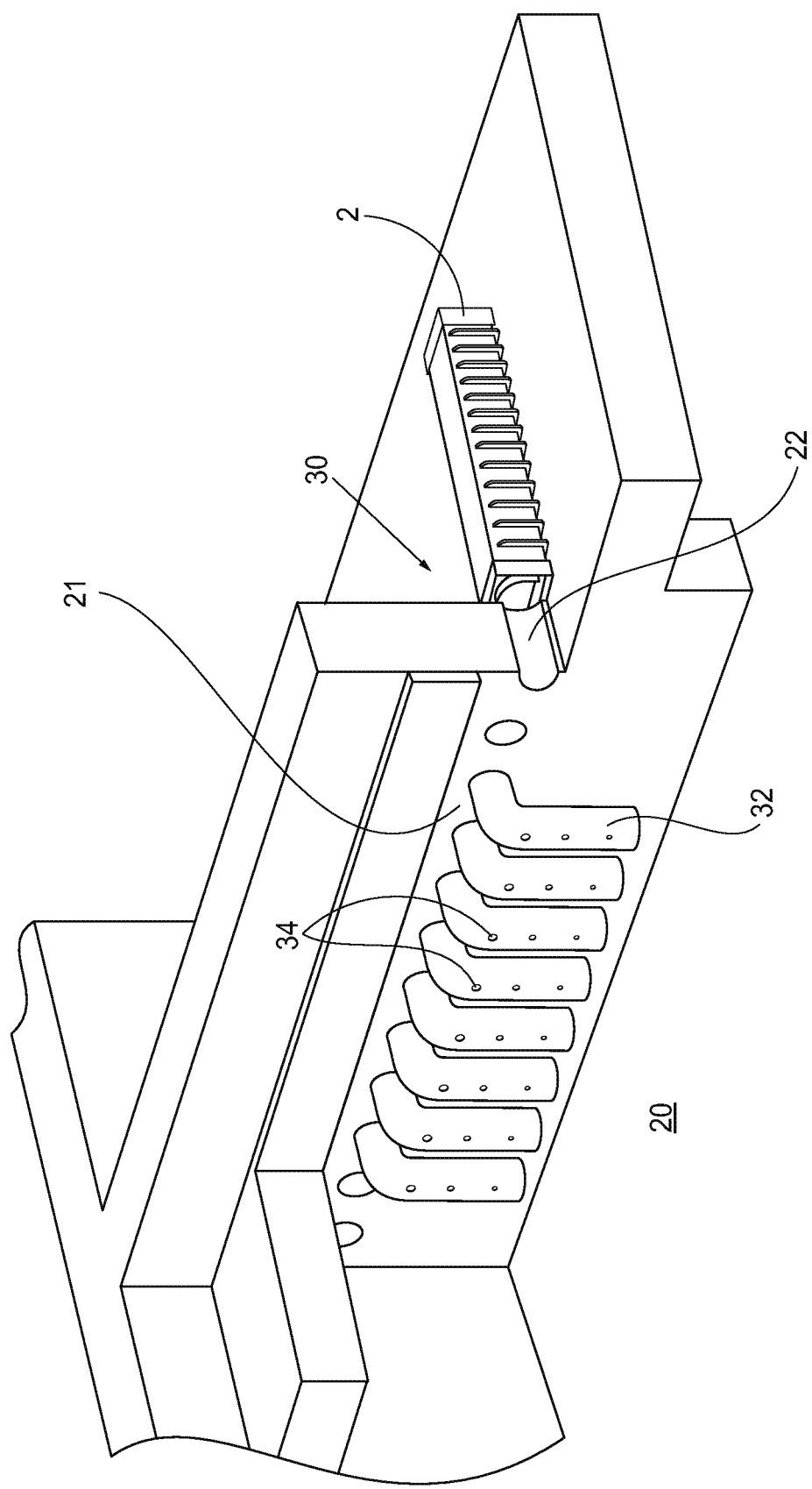
FIG. 13 shows a perspective view of a filtration system with pipe members in fluid communication with each underdrain lateral according to an alternate embodiment of the invention.

Referring to FIGS. 12-13, an alternate embodiment of the filtration system (30) replaces each metering plate (10) with individual pipe members (32). Each pipe member (32) is in fluid communication with its corresponding chamber (22) and underdrain lateral, as shown in FIG. 12. The pipe members (32) can include one or more pipe openings (34). The pipe members (32) can be securely mounted to the flume wall (21) by any means known. The pipe members (32) can be configured as an elbow such that a horizontal end of the elbow pipe member (32) attaches to the flume wall (21) and a vertical end of the elbow pipe member (32) is in fluid communication with the flume (20). The horizontal end of the elbow pipe member (32) can be of sufficient length to allow water to flow concurrently with air and with minimal restriction (i.e., minimal head loss) during either filtration or the backwash cycle.

From the foregoing disclosure and detailed description of certain preferred embodiments, it is also apparent that various modifications, additions, and other alternative embodiments are possible without departing from the true scope and spirit of the present invention. The embodiments discussed were chosen and described to provide the best illustration of the principles of the present invention and its practical applications to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

The invention claimed is:

1. A filtration system, comprising:
   at least one underdrain lateral comprising a plurality of underdrain blocks;
   a flume;
   a flume wall positioned between the at least one underdrain lateral and the flume; and
   at least one metering plate mounted on the flume wall and positioned between the at least one underdrain lateral and the flume, the at least one metering plate comprising a plate member, the plate member comprising at least one opening,
   wherein the at least one opening is of sufficient size to receive liquid or gas therethrough at a first flow rate during a backwash function and the at least one opening is of sufficient size to receive liquid or gas therethrough at a second, lower flow rate during filtration,
   wherein the at least one metering plate mounted on the flume wall defines an offset between the plate member and the flume wall and defines an open end at a bottom of the at least one metering plate.

2. The filtration system of claim 1, wherein the at least one opening is of sufficient size to receive the liquid or gas therethrough at the first flow rate of 3-5 scfm/sf during the backwash function.

3. The filtration system of claim 1, wherein the at least one opening is of sufficient size to receive the liquid or gas therethrough at the second flow rate of 0.25-1.5 scfm/sf during filtration.

4. The filtration system of claim 1, wherein the at least one metering plate is arranged between the at least one underdrain lateral and the flume such that an amount of gas flowing through the at least one opening of the at least one metering plate-is distributed to the at least one underdrain lateral substantially equally during filtration.

5. The filtration system of claim 1, wherein the at least one metering plate is arranged between the at least one underdrain lateral and the flume such that an amount of gas flowing through the at least one opening of the at least one metering plate-is distributed to the at least one underdrain lateral substantially equally during a backwashing cycle.

6. The filtration system of claim 1, wherein the at least one metering plate comprises two openings, a first opening and a second opening, positioned at different elevations along the at least one metering plate,
   wherein the first opening has the same or smaller area than the second opening and is positioned at a higher elevation along the at least one metering plate than the second opening, and
   wherein the first opening is of sufficient size to receive gas therethrough at the second flow rate.

7. The filtration system of claim 6, wherein the first and second openings are of sufficient size to receive gas at the first flow rate of 3-5 scfm/sf during the backwash function.

8. The filtration system of claim 6, wherein the first opening is of sufficient size to receive gas at the second flow rate of 0.25-1.5 scfm/sf during filtration.

\* \* \* \* \*